March 13, 1962   E. C. LUBMANN   3,024,549
SELF-CLOSING GATE
Filed Oct. 8, 1959   2 Sheets-Sheet 1
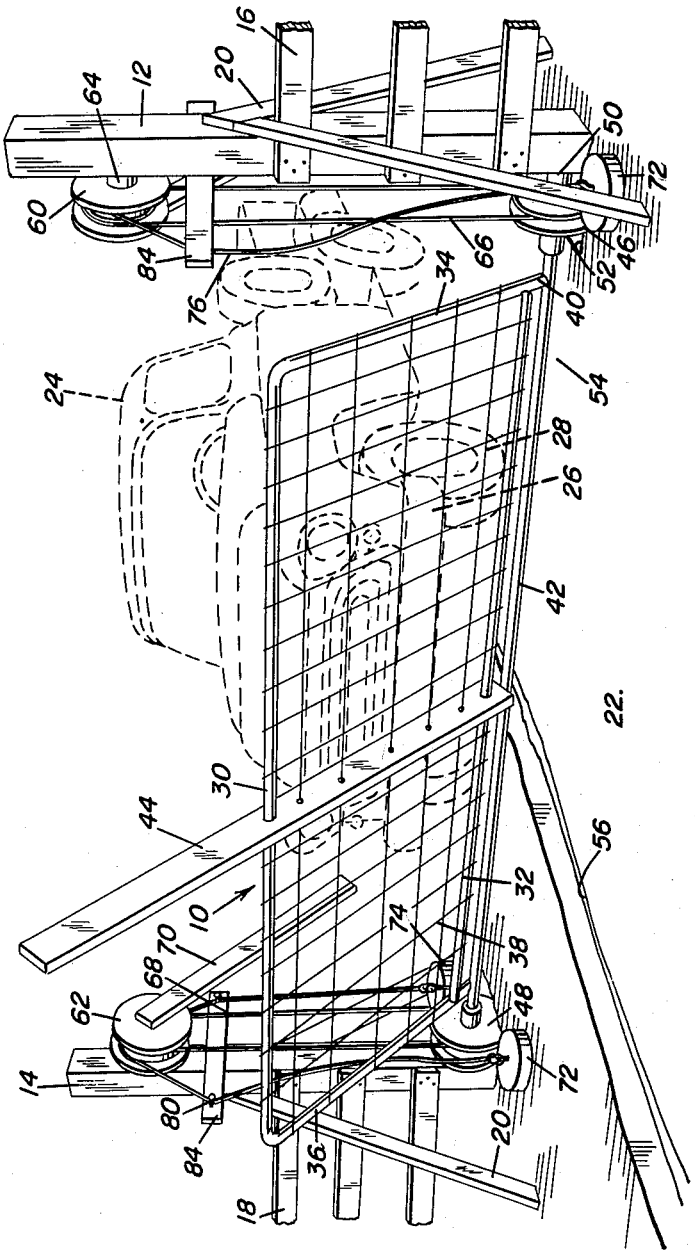
Fig. I
Elmont C. Lubmann
INVENTOR.
BY *Clarence A. O'Brien*
*and Harvey B. Jacobson*
Attorneys

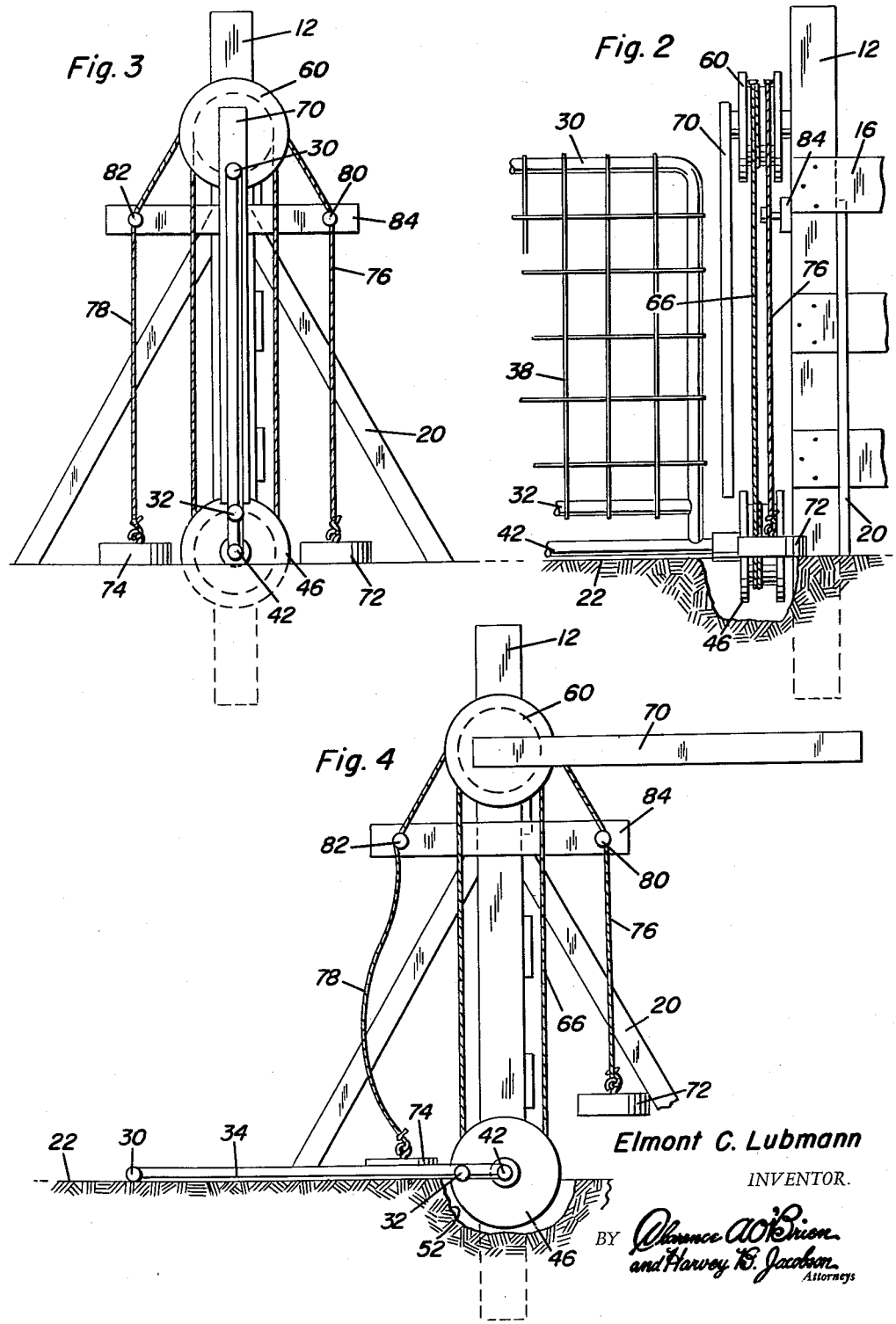

United States Patent Office 3,024,549
Patented Mar. 13, 1962

3,024,549
SELF-CLOSING GATE
Elmont C. Lubmann, Rackerby, Calif.
Filed Oct. 8, 1959, Ser. No. 845,249
5 Claims. (Cl. 39—5)

The present invention generally relates to a gate construction and more particularly to such a gate that is self-closing and is operated by a vehicle engaging the gate when in closed position and moving the gate to an open position after which the gate will automatically return to closed position after the vehicle has passed through.

In many areas, especially on farms, the various portions of the farm are divided by fences. Quite often, it is desirable to have access to the various areas and such access is accomplished by providing an openable gate in a fence opening provided in the fence. When approaching such a gate in a vehicle which is normally employed, it is necessary that the operator of the vehicle stop the vehicle, get out of the vehicle and open the gate, go back to the vehicle and drive through the gate opening, stop the vehicle and get out of the vehicle and close the gate and then get back into the vehicle for further progress. This is time consuming and quite often, gates are unnecessarily left open since they are forgotten which may permit animals to have access to an area from which they are intended to be excluded. Therefore, it is the primary object of the present invention to provide a self-closing gate which is pivotally supported for swinging movement in a vertical plane about substantially a horizontal axis extending between two gate posts so that the gate may swing from a vertical closed position between the two gate posts to a horizontally disposed ground engaging open position with the movement of the gate from the closed to the open horizontal position being accomplished by the vehicle itself engaging the gate and pushing it downwardly to the horizontal position and with the movement of the gate from the open horizontal position to a vertical position being effected by a counterbalance mechanism which serves to return the gate to the vertical position after passage of the vehicle.

Another object of the present invention is to provide a gate construction in accordance with the preceding object in which there is also provided a counterbalance damping mechanism for preventing oscillation of the gate for any extended length of time when the gate returns to closed vertical position.

Still another feature of the present invention is to provide a self-closing gate which is simple in construction, easy to install, employs readily available component parts, effective for its particular purposes, foolproof, long lasting and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the self-closing gate of the present invention illustrating a vehicle approaching and contacting a portion of the gate and partially moving the gate to an open position;

FIGURE 2 is a side elevational view of one end of the gate illustrating the structural arrangement thereof;

FIGURE 3 is an end elevational view of the structure of FIGURE 2; and

FIGURE 4 is a view similar to FIGURE 3 but with the gate in open position illustrating the orientation of the counterbalance weight bar and the independent dampening counterbalance weights.

Referring now specifically to the drawings, the numeral 10 generally designates the self-closing gate of the present invention which is provided in a fence opening defined by vertical posts 12 and 14 which are disposed in parallel spaced relation to each other and to which is attached fencing elements 16 and 18 which may be of any conventional construction such as boards as illustrated or wire and the posts 12 and 14 may be provided with downwardly and outwardly extending braces 20 which extend laterally of the fencing elements 16 and 18. Normally, there will be a road or surface 22 passing between the gate posts 12 and 14 such as will permit a vehicle 24 to proceed from one side of the fence to the other. The vehicle illustrated is a pick-up truck such as normally employed on a farm but other types of vehicles may be employed for operating the gate 10 of the present invention. As illustrated, the vehicle 24 is provided with a bumper 26 which will be employed for pushing the gate over from a vertical closed position to a generally horizontal open position whereupon the wheels 28 of the vehicle will then engage the gate and hold it in horizontal position as the vehicle passes over the gate.

The gate itself includes a peripheral frame having horizontal frame elements 30 and 32 and the vertical frame elements 34 and 36 all of which are interconnected and provided with crossed wire elements 38 or any other suitable wire element closing the interior of the frame. The frame may be made up to pipes connected together with suitable joints or may be of welded or any other suitable construction. The vertical frame elements 34 and 36 are provided with extensions 40 which project below the horizontal frame element 32 and are rigidly connected to a transversely extending horizontal pipe member or shaft 42 which extends beyond the vertical frame elements 34 and 36. Disposed centrally of the frame elements 30 and 32 is a bar 44 through which, in the embodiment which has been illustrated, the gate 10 passes. The bar 44 extends considerably above the gate and forms an abutment or bumper engaging surface which is engaged by the bumper 26 when the vehicle 24 approaches the gate thereby pushing the gate away from the vehicle toward a horizontal position.

The ends of the horizontal pipe member 42 are rigidly secured to drums 46 and 48 respectively which are rotatably supported from the lower end of the posts 12 and 14 respectively by a suitable bearing or spindle structure 50. The drums 46 and 48 are recessed partially below the ground surface in a recess 52 and the pipe 42 may also be recessed below the ground surface and there is provided under the pipe member 42, a supporting two-by-four or the like 54 whereby the pipe member 42 will be partially recessed below the ground surface and supported by the two-by-four element 54 thus preventing substantial deflection of the pipe member 42. This also enables the frame members 30 and 32 to be disposed adjacent the ground surface or against the ground surface since the bar 44 will be received in a longitudinal trough-shaped recess 56 extending from either side of the gate centrally of the roadway 22 so that the gate may swing downwardly to substantially contacting relationship with the ground surface 22 so that the wheels 28 passing over the gate will not cause undue bending thereof.

Disposed above and in alignment with the drums 46 and 48 is a pair of drums 60 and 62 supported adjacent the tops of the posts 12 and 14, respectively, by a bearing or spindle 64 and a flexible line or cable 66 encircles the pulleys 46 and 60 and a similar cable 68 encircles pulleys 48 and 62.

The flexible lines or cables 66 and 68 are wrapped around their respective drums a plurality of times so that when one of the lower drums 46 and 48 are rotated, there will be a corresponding rotation of the upper drum 60 and 62. Since the lower drums 46 and 48 are affixed to the pipe member 42, all of the drums will be rotated in the same direction an equal amount as the gate is swung downwardly or upwardly to a closed position.

Rigidly affixed to each upper drum 60 and 62 is an elongated counterbalance weight bar 70. Each bar 70 has one end affixed to the spindle 64 of the respective drum 60 and extends in a vertical plane and will normally depend in a vertical position from the spindle 64. Each bar 70 is preferably of iron or steel and is one inch by six inches in dimensions and is approximately the same height as the gate. Thus, the two bars 70 will serve to return the upper drums 60 and 62 to a position with the bars 70 disposed in a vertical depending relation thereto. When the bars 70 are in vertical depending relation, the gate is disposed in closed position. When the gate is moved to an open position, the bars 70 will be swung in an opposite direction from the gate to a substantially horizontal position parallel with the ground surface as illustrated in FIGURE 4 so that when the vehicle passes over the gate, the combined weight of the bars 70 and their tendency to return to a vertical position by the force of gravity will rotate the drums 60 and 62 so that the cables and the lower drums in their connection to the pipe 42 will return the gate to a vertical closed position.

Due to the weight of the bars 70 and the fact that they would act as pendulums and oscillate thus causing the gate to oscillate, there is provided dampening weights for dampening the action of the counterbalance weights and the dampening mechanism includes weights 72 on one end of the flexible lines or cables 66 and 68 and a weight 74 also attached to the other ends thereof. The free ends of the cables are designated by the numerals 76 and 78 and the free ends come off of or take off of the upper drums 60 or 62 and pass over projections or guides 80 and 82 carried on a transverse support member 84 on each of the posts 12 and 14 so that the terminal end portions 76 and 78 and the weights 72 and 74 attached thereto will be spaced away from the drums. The weights 72 and 74 normally rest on the ground surface when the gate is in vertical closed position but when the gate is pivoted to an open position, one of the weights such as the weight 72 will be elevated and the other of the weights will remain stationary whereby the terminal end portion 78 will become slack. Thus, when the bars 70 return the gate to a vertical position, the weights 72 will then engage the ground surface and will not aid the bars 70 any further but then the weights 74 will be picked up thus adding an additional weight which the bars 70 have to raise and by subsequently shifting the weight to opposite sides of the drums by the weights 72 and 74 being picked up and then deposited on the ground surface, the oscillatory movement of the bars 70 and of course the gate will be dampened thus bringing the gate to a vertical stand-still with very little oscillation.

The projections 80 and 82 may be provided with rollers or sheaves for receiving and guiding the flexible line or cable. The drums may be conveniently constructed of discarded vehicle wheels in which the cables are wound onto the drop center thereof.

In operation, the operator of a vehicle wishing to pass through the gate will approach the gate in low gear at a very slow speed. The front bumper of the approaching vehicle will engage the two-by-four bracing in the center of the gate as shown in FIGURE 1. The driver of the vehicle will then slowly cause the vehicle to inch forwardly thus pushing the front bumper of the vehicle against the two-by-four bracing in the center of the gate thus pushing the gate forward toward a position flat on the ground. By so engaging the gate and pushing forwardly on it, the drum and pulley mechanism will revolve and the counterbalance bars will rise as illustrated in FIGURE 1 and as shown in FIGURES 3 and 4. When the gate has been pushed completely forward and is lying flat on the ground as shown in FIGURE 4, the vehicle can then be driven completely across it entering the field desired. After the vehicle has passed completely over the gate and proceeds on into the field, the counterbalance arms or bars along with the dampening weights will cause the gate to rise back to a closed vertical position where it will remain until further use is required. The elongated bracing in the center of the gate prevents any part of the gate from catching onto the underside of the vehicle using the gate.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A self-closing gate structure comprising a pair of laterally spaced upright support members, a normally vertically disposed gate extending between said upright members and forming a closure for the space between the upright members, a pair of vertically spaced drums on each upright member, a flexible line wound around each pair of drums so that movement of one drum will cause a corresponding movement of the other drum in each pair of drums, said gate being supported from the center of the lower drums and rigidly connected thereto so that pivotal movement of the gate will cause rotational movement of all of the drums, an elongated and weighted bar rigidly mounted on each of the upper drums for normally urging the drums and the gate to a position with the gate disposed vertically, means disposed centrally on the gate for engagement by a vehicle bumper as it approaches the gate for forcing the gate downwardly from a vertical to a horizontal position thereby permitting the vehicle to pass over the gate with the movement from a vertical position to horizontal position moving the weighted bars from a vertical position to a horizontal position whereby the offset weight of the bars will cause the drums and gate to move back to a normal position with the gate disposed vertically, and means for preventing idle oscillation of the gate in said vertical position.

2. The structure as defined in claim 1 wherein each flexible line wound around a pair of the drums is provided with a pair of free end portions leaving the upper drum on opposite sides, means engaging and guiding the free end portions of the line in spaced relation to the vertical runs of the line extending between the pair of drums, the last-named means including a weight attached to the terminal end of each free end portion of the line, the weights on the ends of the line normally resting on the ground surface when the gate is in vertical closed position, the movement of the gate from a vertical position to a horizontal position causing elevation of the weight on the same side of the upright as the weighted bar whereby the weight will initially assist the bar to move the gate to a closed position after which the alternating raising and lowering of the weights will dampen the oscillation of the weighted bar and the gate.

3. The structure defined in claim 2 wherein said gate includes a peripheral frame with a wire mesh connected thereto, the lower portion of the gate including a transverse frame member having longitudinal extensions rigidly secured to the drum at the center thereof.

4. The structure as defined in claim 3 wherein the means at the center of the gate for engagement by the bumper of a vehicle includes a wooden element projecting to either side of the gate and extending vertically thereabove whereby the projection will prevent the bumper from engaging the gate with the opposed projection being adapted to be received within a recess in the roadway surface so that the gate may rest on the roadway surface when the vehicle passes thereover.

5. A gate structure comprising a pair of spaced supports, a normally vertically disposed gate having a horizontal axis on its lower edge and journaled on said supports, means for yieldingly retaining the gate in a closed vertical position, and gravity operated means for retaining the gate against idle oscillation in said vertical position, the last-named means including a drum affixed to the gate at the axis thereof, a drum journaled on one of the supports above the first-named drum, a drive cable operatively connecting the drums and including free end portions depending from the upper drum on opposite sides thereof, and weights on the ends of the cable to be lifted thereby when the gate is swung out of a vertical position and adapted to rest on a support when said gate is in said vertical position.

References Cited in the file of this patent
UNITED STATES PATENTS

| | | |
|---|---|---|
| 1,630,704 | Kaiser | May 31, 1927 |
| 1,944,349 | Kincaid | Jan. 23, 1934 |
| 2,608,010 | Anderson | Aug. 26, 1952 |
| 2,860,428 | Flatham | Nov. 18, 1958 |